Jan. 9, 1968   J. L. ELLIS   3,362,802
COMBINATION MACHINING TOOL AND TOOL SUPPORT HAVING IMPROVED
VIBRATION DAMPING CHARACTERISTICS
Filed June 25, 1964

INVENTOR.
JOHN L. ELLIS
BY
*E. J. Kalil*
ATTORNEY.

United States Patent Office 3,362,802
Patented Jan. 9, 1968

3,362,802
COMBINATION MACHINING TOOL AND TOOL SUPPORT HAVING IMPROVED VIBRATION DAMPING CHARACTERISTICS
John L. Ellis, White Plains, N.Y., assignor to Chromalloy American Corporation, a corporation of New York
Filed June 25, 1964, Ser. No. 377,966
5 Claims. (Cl. 51—309)

ABSTRACT OF THE DISCLOSURE

A combination metal-removing tool and tool support is provided, wherein the tool support is characterized by high damping properties combined with a high modulus of elasticity. The tool support is formed of a sintered composite metal composition comprising isolated grains and grain aggregates of refractory carbide dispersed through a ductile matrix metal, such as annealed steel. The carbide may range in composition from about 15% to 65% by volume of the total composition and be selected from the group consisting of titanium carbide, columbium carbide, vanadium carbide, tantalum carbide and a solid solution of titanium carbide and tungsten carbide.

---

This invention relates to a combination metal-removing tool and a tool-supporting metal element or shank therefor and, in particular, to a metal-removing machining tool integrally mounted to a supporting composite metal element characterized by high vibration-damping properties in combination with a relatively high degree of stiffness.

The increasing need for reliability in manufactured parts, such as metal parts having precision machined or ground external or internal surfaces, has led to a growing demand for reliable metal-removing machine tools. Examples of such tools are single point chip-removing tools integrally mounted on a supporting element such as a shank, boring bars, drills mounted on a rotatable shaft, burrs or grinding wheels mounted on a rotatable spindle or quill. For the purposes of this disclosure, the supporting element employed in combination with any of metal-removing tools mentioned hereinabove shall be referred to as a shank, whether the element supports a single-point or multiple point cutting tool, a boring tool, a drill, a burr, a grinding wheel, or the like. Another example of a supporting metal element or shank is a milling cutter body comprising a rotary metal element to which a plurality of cutting tools are mounted.

Generally speaking, it is not uncommon for the accuracy of surface finish of a manufactured part to be measured in millionths of an inch. Because few, if any, machining tools are rigid in terms of these dimensions, a certain amount of deflection accompanied by surface imperfections is inevitable. Such imperfection are generally revealed as chatter marks, poor surface finish, tapered holes, loss of size, and the like. Because much higher machining speeds have been made possible with cemented carbides and ceramic cutting tools, the problem of vibration tends to be aggravated. The overall problem of chatter and vibration usually results in reduced or limited production, inferior parts and excessive scrap.

In recent years, attempts have been made to eliminate or minimize chatter by providing heavier machine beds, heavier and better supported saddles, wider ways, more accurate spindle bearings, as well as many other features. Yet, despite such innovations, the metal-removing tool generally required for most machining or grinding operations must of necessity project as overhung beams in taking on relatively high cutting loads. Thus, beam stiffness, which is a function of Young's modulus of elasticity is an important criterion in machine tool design.

Shanks of single-point cutting tools, boring bars, or shafts or quills for burring tools or grinding wheels are in most cases made from steel which has a modulus of elasticity of about $30 \times 10^6$ p.s.i. (pounds per square inch). The use of cemented tungsten carbide as a tool-shank material has been given recent consideration because of its very high modulus of elasticity which may range from about 75 to $90 \times 10^6$ p.s.i. While the cemented carbide appears to have three times the rigidity factor as steel, it nevertheless does not have the desirable virbation-damping property, which is also an important criterion in tool design.

It is, therefore, an object of this invention to provide a machining tool having an improved combination of properties characterized by relatively high stiffness in combination with high vibration-damping properties.

Another object is to provide the combination of a metal-removing tool portion and a supporting shank therefor, said shank characterized by a composite metal composition having a relatively high modulus of elasticity combined with good vibration-damping properties.

As still another object, the invention provides as an article of manufacture a tool-shank formed of a composite metal composition comprising substantially isolated primary grains of refractory metal carbide dispersed through a steel matrix.

These and other objects will more clearly appear when taken in conjunction with the following disclosure and the accompanying drawing, wherein:

FIGS. 7 and 8 are illustrative of single-point cutting tools mounted on a shank, FIG. 7 representing a cutting tool for use with a lathe, while FIG. 8 represents a boring tool.

Figure 1:
FIGS. 1 to 4 are illustrative of a metal-removal tool comprising a drill or burr integral with a rotatable shank.

In its broad aspects, the invention comprises a tool-supporting metal element or shank and, more preferably, the combination of a metal-removing tool and a tool-supporting metal element, the shank being formed of a sintered metal composition comprising isolated primary grains and grain aggregates of a refractory metal carbide, for example titanium carbide, dispersed throughout a ductile metal matrix such as an annealed steel matrix. In its more preferred aspects, the invention comprises a tool-supporting element and, more preferably, the combination of a metal-removing tool and a tool-supporting element, the element being formed of a sintered metal composition comprising isolated primary grains and grain aggregates of a refractory metal carbide, for example titanium carbide, dispersed throughout a ductile metal matrix, such as annealed steel matrix. In its more preferred aspects, the composition of the tool shank material comprises 15 to 65% by volume of said isolated primary refractory carbide grains, with the ductile metal matrix making up essentially the balance. A more narrow range found commercially useful comprises about 30% to 60% by volume of refractory carbide and the balance a ductile metal matrix. A composition which has given particularly desirable results comprises about 45% by volume of primary grains of refractory carbide, e.g. titanium carbide, and about 55% by volume of steel in the annealed state.

Among the refractory carbides found particularly adapted for a tool support material is titanium carbide and a saturated solid solution of tungsten carbide in titanium carbide. Examples of other refractory carbides are columbium carbide, vanadium carbide, tantalum carbide and the like. As illustrative of titanium carbide compositions which may be employed in carrying out the invention, reference is made to U.S. Patent 2,828,202. Likewise, as illustrative of compositions utilizing primary grains of a saturated solid solution of tungsten carbide, titanium carbide reference is made to U.S. Patent 3,053,706.

Examples of ductile metals which may be employed in combination with the refractory carbide, especially titanium carbide, include ductile metals having a melting point above 1250° C., such as the iron group metals iron, nickel, cobalt and base alloys thereof. However, I prefer ferrous alloys, that is iron-base alloys. In particular, I prefer heat treatable steels in the annealed state such as low, medium and high carbon steels available as SAE 1010 steel, SAE 1020 steel, SAE 1030 steel, SAE 1040 steel, SAE 1080, etc. Pure iron may be used, or it may be combined with carbon to form a steel during the process of producing the ferrous alloy of the invention. Low, medium and high alloy steels may also be employed, including the following: about 0.8% chromium, 0.2% molybdenum, about 0.30% carbon, and iron substantially the balance; about 5% chromium, 1.4% molybdenum, 1.4% tungsten, 0.45% vanadium, 0.35% carbon, and iron substantially the balance; about 8% molybdenum, 4% chromium, 2% vanadium, 0.85% carbon, and iron substantially the balance; about 18% tungsten, 4% chromium, 1% vanadium, 0.75% carbon, and iron substantially the balance; about 20% tungsten, 12% cobalt, 4% chromium, 2% vanadium, 0.80% carbon, and iron substantially the balance; and generally other types of steels characterized crystallographically by a body centered cubic structure at ordinary temperatures and by being transformable to a face centered cubic structure at an elevated temperature below the melting point of the steel.

As stated above and for the purposes of this invention, the steel matrix should be annealed, the gross hardness of the carbide-steel allow preferably not exceeding about 50 $R_c$. In achieving the foregoing, it is desirable that the steel matrix surrounding the primary carbide grains have a mircostructure selected from the group consisting of pearlite and spheroidite. The presence of the foregoing microstructure assures fairly high vibration-damping properties.

In producing refractory carbide bodies of the foregoing types, powder metallurgy is generally employed. The method usually comprises mixing refractory carbide particles with finely divided matrix-forming bonding metal, compacting the mixture into a desired shape in a mold, and then subjecting the resulting compact to liquid phase sintering by heating it to a temperature above the lowest melting phase of the matrix metal but below the melting point of the refractory carbide. Liquid phase sintering is preferred as dense products are assured substantially free from porosity.

As one example of producing a body containing 40% by weight of TiC (about 50% by volume), 1000 grams of TiC of about 5 to 7 microns in size are mixed in a steel mill with 1500 grams of steel-forming ingredients comprising iron powder of 20 microns average size and 0.80% carbon, the powdered ingredients containing 1 gram of paraffin wax for each 100 grams of mix. The milling is conducted for about 40 hours with the mill half full with stainless steel balls, using hexane as the vehicle.

After completion of the milling, the mix is removed and vacuum dried. A proportion of the mixed product is compressed in a die at 15 tons/sq. in. to the desired shape. The shape is liquid phase sintered at a temperature of about 1435° C. for one-half hour at a vacuum corresponding to 20 microns of mercury or better. After completion of sintering, the shape is cooled and then annealed by heating to 900° C. for 2 hours followed by cooling at a rate of about 15° C./hour to about 100° C. to produce an annealed microstructure containing spheroidite, the hardness being about 43 $R_c$. The sintered shape is then machined into a tool-support or shank. The shank in the annealed state has a rather high degree of stiffness as evidenced by a modulus of elasticity of about $45 \times 10^6$ p.s.i. The primary carbide grains are isolated and substantially completely surrounded by the metal matrix.

As illustrative of the various machine tools employing the tool shank of the invention, reference is made to the drawing, wherein FIG. 1 shows a drill mounting comprising the drill portion 10 made of conventional high speed steel or a conventional cutting grade of cemented tungsten carbide such as grade #C–2 secured to an annealed tool shank 11 by means of a butt weld designated by the numeral 12. The tool support or shank, having the composition stated above, has a high degree of vibration-damping, as well as a high degree of stiffness.

Figure 2:

In FIG. 2, a heavier drill mounting is shown comprising drill portion 13 secured to a tool-support or shank 14 by means of a brazed joint 15. The tool support may have a composition of about 60% by volume of titanium carbide, with the balance consisting essentially of steel having a pearlitic microstructure, for example a steel composition containing by weight 0.8% Cr, 0.2% Mo, 0.3% C and the balance iron.

Figure 3:
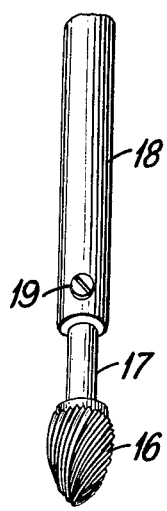

In FIG. 3, instead of a drill, a burring tool is shown comprising a burr 16 secured via its stem 17 to support 18 by means of locking screw 19. The support or shank may comprise 70% by volume of TiC dispersed through iron or through an annealed steel matrix characterized by a microstructure of spheroidite. Such a steel may comprise by weight 1.25% Cr, 2.5% Mo, 0.4% C and the balance iron.

Figure 4:
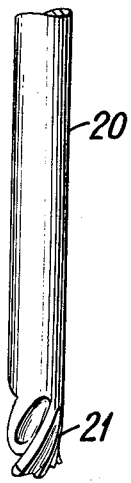

Referring to FIG. 4, a single piece machine tool is shown comprising tool support 20 which terminates into a drill head 21. The drill head which has the same composition as the shank is hardened while the support or sank above it is annealed. The machining tool is produced from a single piece having a composition of, for example, 50% by volume of grains of a standard solid solution of tungsten carbide and titanium carbide dispersed through a high speed steel matrix of 18–4–1 composition. A rod of the composition is first sintered, annealed, and then machined to the desired diameter. A drill is rough machined into one end of the rod and the drill end of the rod heated to about 1250° C. and then oil quenched to a hardness of about 72 $R_c$ followed by double tempering at 1025° F. The drill is then lapped to size. The unhardened portion of the tool which has a hardness not exceeding 50 $R_c$ serves as the vibration-resistant tool shank.

Figure 5:
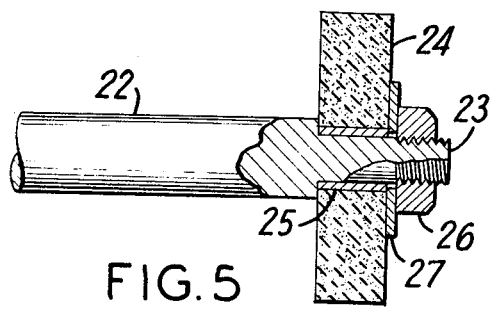
FIGS. 5 and 6 depict two types of grinding tools in which the grinding member is mounted on a shank in the form of a spindle or quill adapted to provide stiffness combined with good vibration-damping properties.
Figure 6:
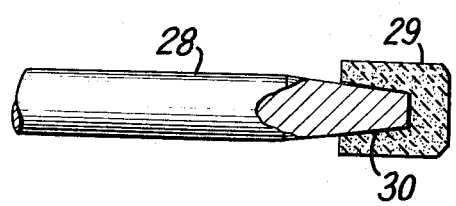

In FIG. 5, the tool shank is shown as a rotatable shaft or quill 22 having a reduced end portion 23 upon which a grinding wheel 24 is mounted. The wheel has a centrally located bushing 25 which fits over the reduced end portion of the shaft, the wheel being fastened in position by means of a nut 26 which is tightened up against washer 27 adjacent the side of the wheel. The quill may have a composition comprising about 35% by volume of grains of titanium carbide dispersed through an annealed steel matrix constituting about 65% by volume of the composition. An example of a steel employed as a matrix is one containing by weight 1.25% Cr, 0.4% V, 0.3 to 0.4% C, and the balance iron. FIG. 6 is similar to FIG. 5 except the tool shank or quill 28 is tapered and has mounted on the end thereof a cup-shaped abrasive wheel 29 fused bonded at the interior thereof, at 30, to thetapered end of the shank.

Figure 7:
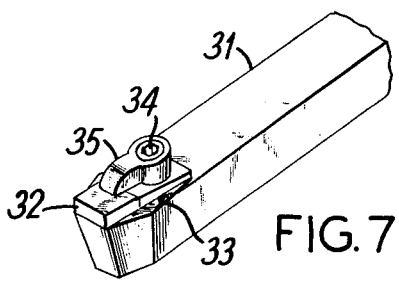

FIG. 7 shows a single point cutting tool having a supporting shank of a composition which may comprise about 55% by volume of primary grains of titanium carbide dispersed through an annealed low chrome low moly steel matrix. The shank serves as a vibration-resistant support for a single point cutting tool of, for example, a cemented tungsten carbide tip held in a stepped recess 33 by means of a mechanical fastener 34 having an overhanging shoulder portion 35 which bears down on tool tip 32 and holds it in place. The shank resists cantilever bending while under load and inhibits chattering.

Figure 8:
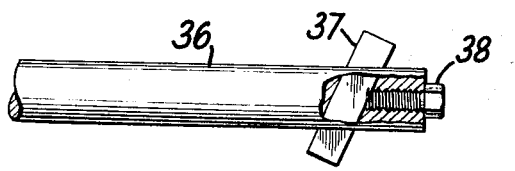

In FIG. 8, a boring tool is shown comprising a shank 30 having offset at its end a single point cutting tool 37 held in position by means of an axially threaded fastener 38.

As has been stated herein, the ability of a material to dampen vibration is an important factor in selecting a desirable tool support. The amplitude of forced vibration, such as occurs with a machining tool supported as a cantilever beam, can be reduced in many cases by using structural materials having a high degree of inherent damping. The most desirable tool support material would be one in which high stiffness (e.g. high modulus of elasticity) is combined with the ability to dissipate vibrational energy. As mentioned hereinbefore, cemented tungsten carbide has a very high degree of stiffness (modulus of elasticity of about $90 \times 10^6$ p.s.i.) but, for some reason, it does not seem to have the desired damping properties. Material damping is usually described in terms of a linear single-degree-of-freedom system, often represented as a viscous damper parallel with an elastic spring. The units of material damping most commonly used in the literature are the "specific damping capacity" and the logarithmic decrement as expressed by the Greek symbol $\delta$. Frequently, the logarithmic decrement is determined from the rate of decay of vibrations of torsion pendulums and cantilever beams. Tests have indicated that the machining tool support of the invention exhibits a markedly high logarithmic decrement compared to cobalt-cemented tungsten carbide and D-2 chromium steel whose composition by weight consists of 1.5% C, 0.4% Mn, 0.4% Si, 12% Cr, 0.15% V, 1.0% Mo, 1.0% Co and the balance iron. The logarithmic decrement of the foregoing materials are compared in the table below:

| Material | Logarithmic Decrement (Annealed) | Modulus of Elasticity, p.s.i. |
| --- | --- | --- |
| The invention* | $1,100 \times 10^5$ | $45 \times 10^6$ |
| D-2 chromium steel | $12 \times 10^5$ | $30 \times 10^6$ |
| Cemented tungsten carbide | $40 \times 10^5$ | $75-90 \times 10^6$ |

*About 45% by volume of TiC and the balance essentially steel, the steel comprising by weight 0.8% C, 3% Mo, 3% Cr and the balance iron.

It will be noted that the tool support of the invention exhibits about ninety times the vibrational damping capacity of the D-2 chromium steel, while at the same time exhibiting about one and one-half times the stiffness as determined from its modulus of elasticity. Likewise, it will be noted that the tool support of the invention exhibits about 27 times the vibrational damping capacity of the cemented tungsten carbide material.

Apparently, so long as the primary refractory carbide grains or grain aggregates in the tool support material are substantially isolated and surrounded by an annealed steel matrix, the relatively high vibrational damping property obtains. For example, when the steel matrix is in the hardened condition, the logarithmic decrement falls to the much lower value of about 50 to $100 \times 10^5$. The microstructure of the annealed steel matrix should be either pearlitic or spheroiditic to insure the desired damping property.

Examples of other heat treatable refractory carbide compositions that may be employed as a tool support are:

| Refractory Carbide | Vol. Percent Carbide | Steel Matrix | Vol. Percent Steel |
| --- | --- | --- | --- |
| VC | 35 | SAE 1060 | 65 |
|    | 45 | Low Chrome, Low Moly | 55 |
|    | 65 | SAE 1080 | 35 |
| CbC | 35 | SAE 1060 | 65 |
|     | 45 | Low Chrome, Low Moly | 55 |
|     | 65 | SAE 1045 | 35 |
| TaC | 35 | 18-4-1 high speed steel | 65 |
|     | 45 | SAE 1060 | 55 |
|     | 65 | SAE 1045 | 35 |

While the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A metal-removing tool comprising in combination a metal-removing tool portion integral with a composite metal tool support characterized by high damping properties combined with a high modulus of elasticity, said tool support being formed of a sintered composite metal composition comprising about 15% to 65% by volume of isolated primary grains and grain aggregates of a refractory metal carbide selected from the group consisting of titanium carbide, columbium carbide, vanadium carbide, tantalum carbide and a solid solution of titanium carbide and tungsten carbide dispersed through an annealed steel matrix.

2. A metal-removing tool comprising in combination a metal-removing tool portion integral with a composite metal tool support, said tool support being formed of a sintered composite metal composition comprising about 15 to 65% by volume of isolated primary grains and grain aggregates of a refractory metal carbide selected from the group consisting of titanium carbide, columbium carbide, vanadium carbide, tantalum carbide, and a solid solution of titanium carbide and tungsten carbide dispersed through an annealed steel matrix having a microstructure selected from the group consisting of pearlite and spheroidite.

3. The combined metal-removing tool and tool support of claim 2 in which the carbide composition ranges from 30 to 60% by volume.

4. The combined metal-removing tool and tool support of claim 2 in which the primary carbide grains are substantially titanium carbide.

5. The combined metal-removing tool and tool support of claim 2 in which the primary carbide grains are substantially a solid solution of titanium carbide and tungsten carbide.

References Cited

UNITED STATES PATENTS

| | | | |
| --- | --- | --- | --- |
| 1,826,454 | 10/1931 | Comstock | 51—309 |
| 1,826,455 | 10/1931 | Comstock et al. | 51—309 |
| 2,228,871 | 1/1941 | De Bats | 51—309 |
| 2,306,423 | 12/1942 | Bernstorff et al. | 51—309 |
| 2,347,920 | 5/1944 | Mays | 51—309 |
| 2,630,383 | 3/1953 | Schwarts | 51—309 |
| 3,258,817 | 7/1966 | Smiley | 29—191.2 |

DONALD J. ARNOLD, *Primary Examiner.*